(12) United States Patent
Wittmer et al.

(10) Patent No.: US 11,581,776 B2
(45) Date of Patent: Feb. 14, 2023

(54) ENVIRONMENTALLY PROTECTED SEALED ELECTRIC MOTOR

(71) Applicants: Terry Wittmer, New Orleans, LA (US); Martin Kuetzing, San Diego, CA (US)

(72) Inventors: Terry Wittmer, New Orleans, LA (US); Martin Kuetzing, San Diego, CA (US)

(*) Notice: Subject to any disclaimer, the term of this patent is extended or adjusted under 35 U.S.C. 154(b) by 363 days.

(21) Appl. No.: 16/930,153

(22) Filed: Jul. 15, 2020

(65) Prior Publication Data

US 2021/0249927 A1 Aug. 12, 2021

Related U.S. Application Data

(60) Provisional application No. 63/036,903, filed on Jun. 9, 2020, provisional application No. 62/972,023, filed on Feb. 9, 2020.

(51) Int. Cl.
| | | |
|---|---|---|
| *H02K 5/18* | (2006.01) | |
| *H02K 5/10* | (2006.01) | |
| *H02K 9/06* | (2006.01) | |
| *H02K 5/22* | (2006.01) | |
| *H02K 5/20* | (2006.01) | |

(52) U.S. Cl.
CPC ............. *H02K 5/10* (2013.01); *H02K 5/18* (2013.01); *H02K 5/20* (2013.01); *H02K 5/225* (2013.01); *H02K 9/06* (2013.01)

(58) Field of Classification Search
CPC .. H02K 9/06; H02K 9/08; H02K 9/19; H02K 9/223; H02K 5/10; H02K 5/18; H02K 5/20; H02K 5/225
See application file for complete search history.

(56) References Cited

U.S. PATENT DOCUMENTS

| | | | | |
|---|---|---|---|---|
| 2016/0134177 | A1* | 5/2016 | Itoh ........................ | H02K 9/19 105/59 |
| 2018/0262094 | A1* | 9/2018 | Blankemeier ........ | H02K 49/106 |
| 2019/0386537 | A1* | 12/2019 | Dib ........................ | H02K 5/18 |
| 2020/0182251 | A1* | 6/2020 | Cader .................... | F04D 29/406 |
| 2021/0006126 | A1* | 1/2021 | Sieger ..................... | H02K 9/06 |

* cited by examiner

*Primary Examiner* — Bryan R Perez
(74) *Attorney, Agent, or Firm* — Luis Figarella

(57) ABSTRACT

A structure for sealing an electric motor so that it is not affected by the humidity from the environment it is placed in, while at the same time the heat generated within the structure is removed into the environment preventing long term motor damage.

16 Claims, 10 Drawing Sheets

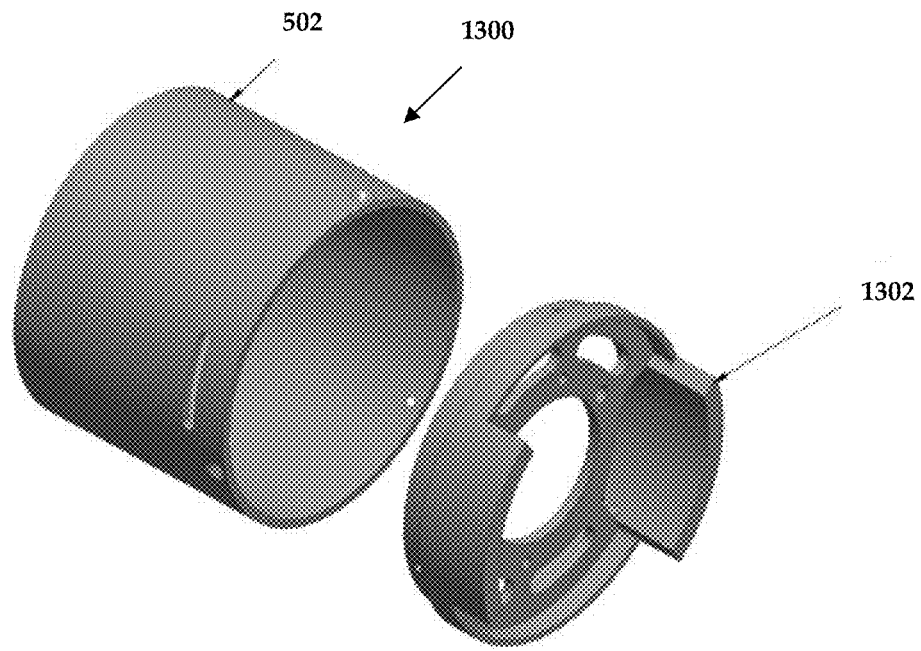
Figure 13
Figure 14
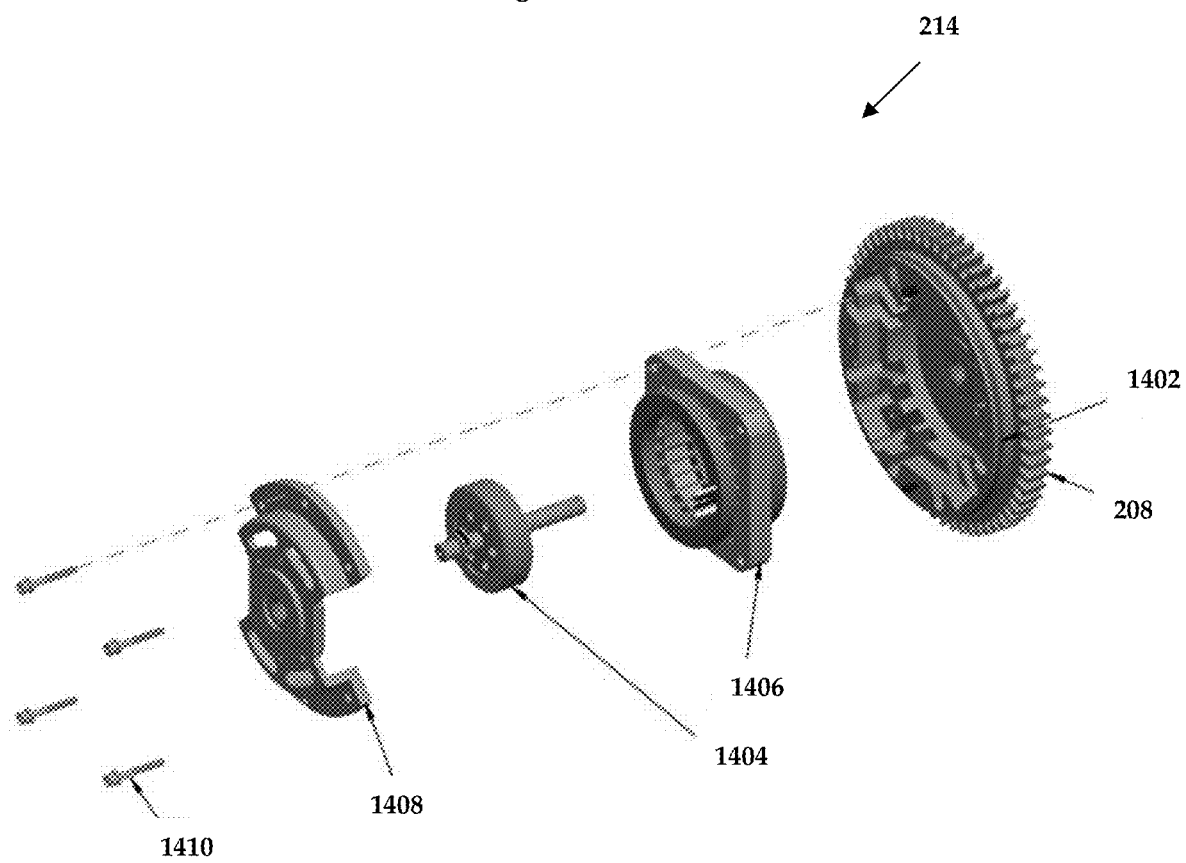

ENVIRONMENTALLY PROTECTED SEALED ELECTRIC MOTOR

CROSS-REFERENCE TO RELATED APPLICATIONS

This application claims priority to U.S. Provisional patent application Ser. No. 62/972,023 titled "Sealed Split Capacitor Motor", filed on Feb. 9, 2020, and Ser. No. 63/036,903 titled "Sealed Split Capacitor Motor", filed on Jun. 9, 2020, the disclosure of both which are herein incorporated by reference in their entirety.

PATENTS CITED

The following documents and references are incorporated by reference in their entirety, Foster et al (U.S. Pat. Appl. No. 2006/0039110), Lin (U.S. Pat. No. 5,421,402), Hardin (U.S. Pat. No. 9,038,214), Yachi et al (U.S. Pat. No. 6,966,937) and Gauger et al (U.S. Pat. No. 6,321,764).

FIELD OF THE INVENTION

The present invention relates to a motor assembly that keeps humid and salty air away from the internal electrical motor components of a fan, while allowing motor generated heat to be extracted from the assembly, and specifically to a motor housing for use in environments where salt air, sand, and other industrial caustic chemicals can interfere with the operation of the motor.

DESCRIPTION OF THE RELATED ART

Establishments located near salt air water bodies, like bars that are located seaside or near marshes, have overhead fans that tend to have very short useful lives. Commonly, their internal electrical components have salt deposited in them, which results in 'arcing' (as the salt depositions connect portions of the circuit that should not connect), resulting in damaged internal electric components.

An intuitive solution is to place the fan motor, within a sealed enclosure. This may be a pneumatic seal, or even a complete seal capable of being immersed in water. Since the motor components, represent the majority of the heat generating components in the fan, sealing the area where the motor is will lead to poor thermal extraction and potential failure of the components due to overheating.

Since such fans are usually operated because the area is hot (most people don't operate their fans in their frozen decks), we have a hot motor, within a hot enclosure, leading to heat failure. There exists a need for an electrical motor housing that can be sealed (pneumatically) yet operate in high heat areas without suffering catastrophic failures.

SUMMARY OF THE INVENTION

This section is for the purpose of summarizing some aspects of the present invention and to briefly introduce some embodiments. Simplifications or omissions may be made to avoid obscuring the purpose of the section. Such simplifications or omissions are not intended to limit the scope of the present invention.

All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e., that it will be taken to mean an inclusion of not only the listed components it directly references, but also other non-specified components or elements. This rationale will also be used when the term 'comprised' or 'comprising' is used in relation to one or more steps in a method or process.

In one aspect, the invention is about a sealed electric motor enclosure comprising a front cover, a back cover and one or more center housings sections concatenated and connected so as to form a sealed enclosure, an electric motor mounted within said enclosure, mechanically linked to said front cover, so that said motor's shaft protrudes across said front cover, a duct inserted within said enclosure's central core, running from said motor to an area above said back cover, so that a fluid path going from said motor along the center and retuning to said motor along the outside of said duct is formed, said enclosure's internal volume is filled with an electrically inert fluid and power connections across said enclosure walls.

In another aspect, a fan blade is placed within said duct and connected to said shaft. In yet another aspect, one or more said center housing sections, said front cap or said back cap are equipped with external fins. In another aspect, one or more said center housing sections, said front cap or said back cap are equipped with internal fins. In yet another aspect, said sealed enclosure is filled with an electrically insulating fluid including one or more of: air, gas, silicone fluids, said external fins are comprised of one or more of: fins that are chemically secured and/or mechanically secured to said sealed enclosure body and/or fins that are an integral part of said sealed enclosure body and said internal fins are comprised of one or more of: fins that are chemically secured and/or mechanically secured to said sealed enclosure body and/or fins that are an integral part of said sealed enclosure body. In another aspect, an external fan blade is attached to said shaft. In yet another aspect, a separate internal electric motor is coupled with said duct so as to provide internal fluid motion independent of said electric motor operation. In another aspect, one or more said center housing sections, said front cap or said back cap are equipped with external fins. In yet another aspect, one or more said center housing sections, said front cap or said back cap are equipped with internal fins. In another aspect, an external fan blade is attached to said shaft.

In one aspect, the invention is about a method of operating a motor, said method comprising: providing a sealed electric motor enclosure comprised of a front cover, a back cover and one or more center housings sections concatenated and connected so as to form a sealed enclosure, said enclosure housing an electric motor mounted within said enclosure, mechanically linked to said front cover, so that said motor's shaft protrudes across said front cover, said enclosure housing a duct inserted within said enclosure's central core, running from said motor to an area above said back cover, so that a fluid path going from said motor along the center and retuning to said motor along the outside of said duct is formed, wherein said enclosure's internal volume is filled with an electrically inert fluid and power connections across said enclosure walls are connected to a power source.

In another aspect, a fan blade is placed within said duct and connected to said shaft. In yet another aspect, one or more said center housing sections, said front cap or said back cap are equipped with external fins. In another aspect, one or more said center housing sections, said front cap or said back cap are equipped with internal fins. In yet another aspect, said sealed enclosure is filled with an electrically insulating fluid including one or more of: air, gas, silicone fluids, said external fins are comprised of one or more of: fins that are chemically secured and/or mechanically secured to said sealed enclosure body and/or fins that are an integral part of said sealed enclosure body and said internal fins are comprised of one or more of: fins that are chemically secured and/or mechanically secured to said sealed enclosure body and/or fins that are an integral part of said sealed enclosure body. In another aspect, an external fan blade is attached to said shaft. In yet another aspect, a separate internal electric motor is coupled with said duct so as to provide internal fluid motion independent of said electric motor operation. In another aspect, one or more said center housing sections, said front cap or said back cap are equipped with external fins. In yet another aspect, one or more said center housing sections, said front cap or said back cap are equipped with internal fins. In another aspect, an external fan blade is attached to said shaft.

Other features and advantages of the present invention will become apparent upon examining the following detailed description of an embodiment thereof, taken in conjunction with the attached drawings.

BRIEF DESCRIPTION OF THE DRAWINGS

FIG. 13 is a perspective view of the fan duct assembly, according to an exemplary embodiment of the invention.

FIG. 14 is an exploded perspective view of the front cap, according to an exemplary embodiment of the invention.

Figures 1, 2:
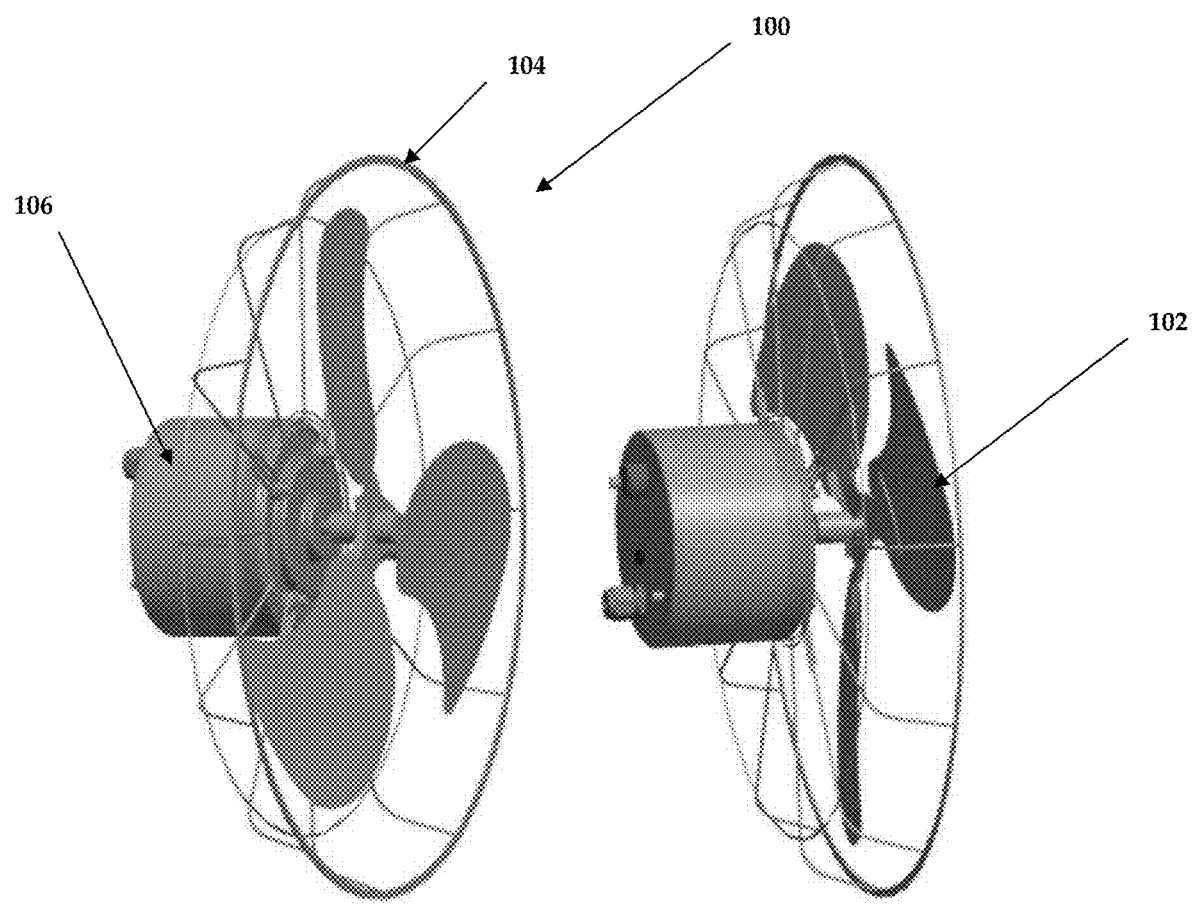
FIGS. 1-2 represent front and back perspective views of a fan assembly, according to an exemplary embodiment of the invention.

The above-described and other features will be appreciated and understood by those skilled in the art from the following detailed description, drawings, and appended claims.

DETAILED DESCRIPTION OF THE INVENTION

This section is for the purpose of summarizing some aspects of the present invention and to briefly introduce some embodiments. Simplifications or omissions may be made to avoid obscuring the purpose of the section. Such simplifications or omissions are not intended to limit the scope of the present invention.

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

Simplifications or omissions may be made to avoid obscuring the purpose of the section. Such simplifications or omissions are not intended to limit the scope of the present invention. All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

As used in the specification and claims, the singular forms "a", "an" and "the" include plural references unless the context clearly dictates otherwise. For example, the term "a transaction" may include a plurality of transaction unless the context clearly dictates otherwise. As used in the specification and claims, singular names or types referenced include variations within the family of said name unless the context clearly dictates otherwise.

Certain terminology is used in the following description for convenience only and is not limiting. The words "lower," "upper," "bottom," "top," "front," "back," "left," "right" and "sides" designate directions in the drawings to which reference is made, but are not limiting with respect to the orientation in which the modules or any assembly of them may be used.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Referring to FIGS. 1-2, we can see front and back perspective views of a fan assembly 100, according to an exemplary embodiment of the invention. A blade 102 is moved within a safety cage/enclosure 104 by a motor (typically electric, Alternate Current (AC) or Direct Current (DC) powered) contained within a housing 106.

Figure 3:
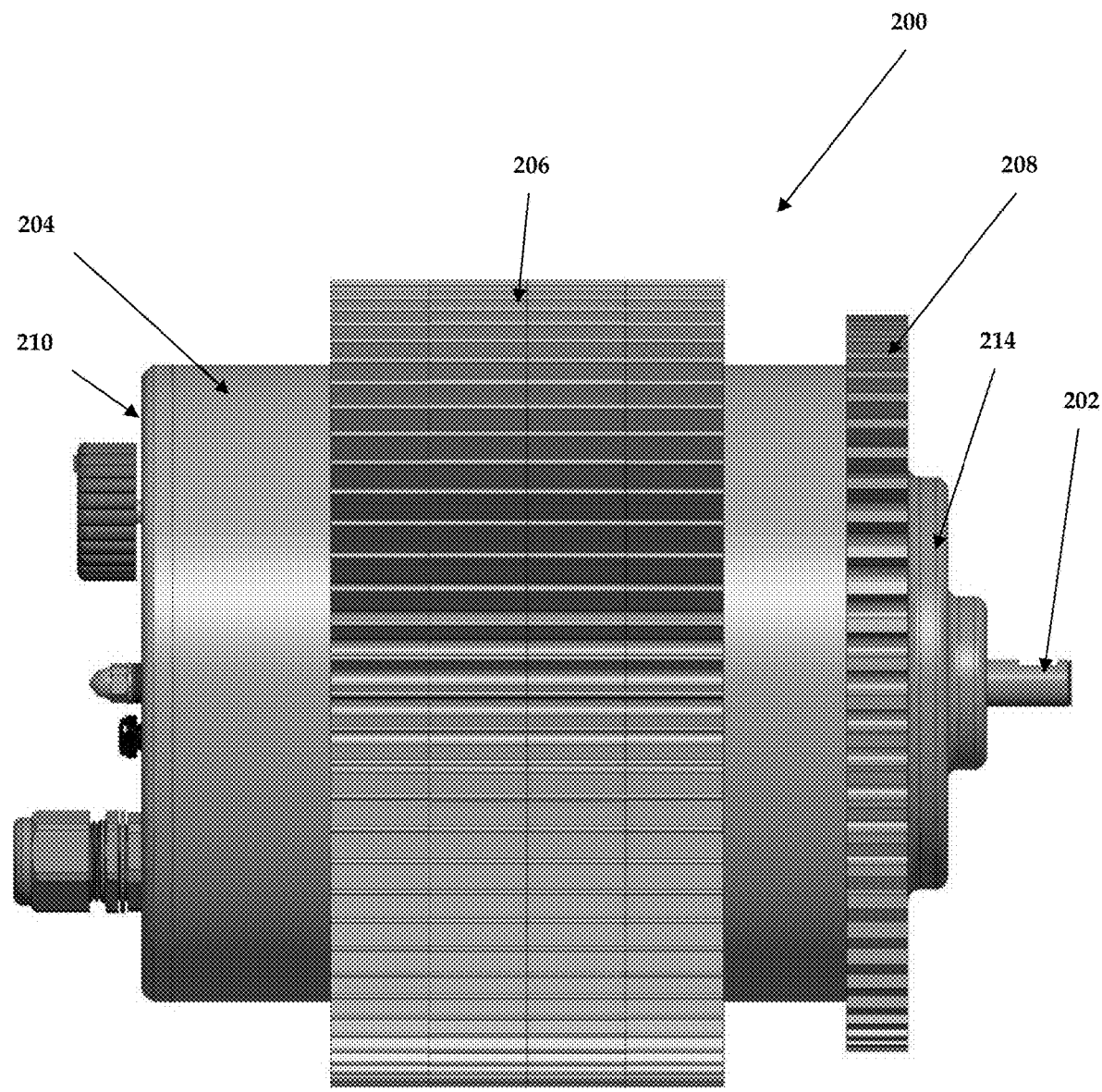
FIG. 3 is a side view of the proposed motor enclosure, according to an exemplary embodiment of the invention.

Normally, these enclosures 106 have openings to allow air to circulate, but in one proposed embodiment (FIG. 3) of the invention, a sealed motor enclosure 200. Such an enclosure has an axle 202 connected the motor, from which rotation is transmitted to the fan blade 102. The enclosure 200 is sealed, either pneumatically and/or completely (meaning water, pressure, etc.). The overall enclosure 200 is formed from an overall center housing body 204 formed from one or more elongated shapes concatenated from front to back, front cap 214 and back cap 210 which seal the motor components inside, with control/power/ancillary connections across the back cap 210, and one or more sets of fins 206 attached to the center housing 204, as well as similar front cap fin elements 208 along the edge of the front cap 214. In one embodiment, similar fins may be added to the back cap 210. In all cases, both may have either inside and/or outside fins.

Figure 4:
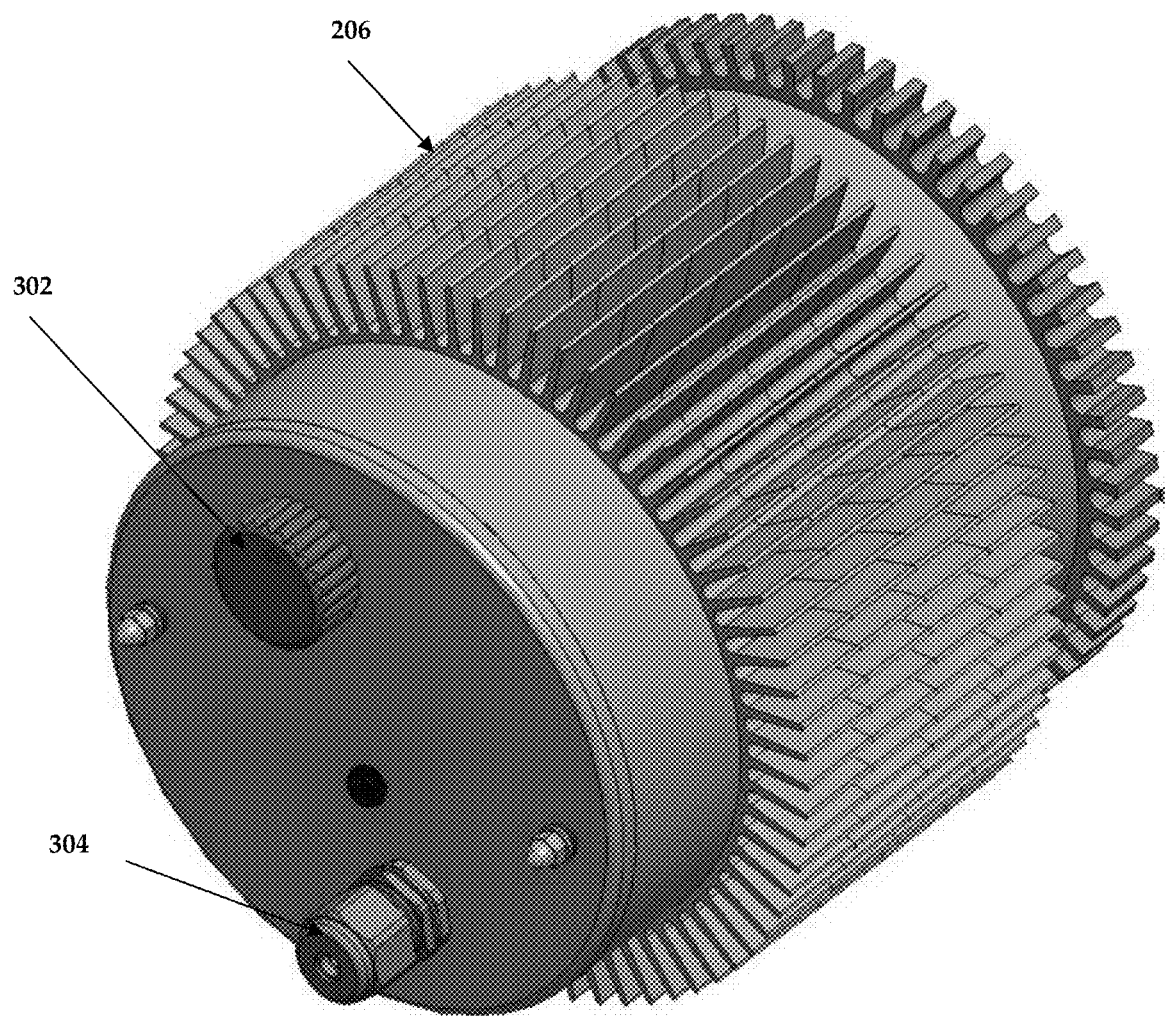
FIG. 4 is a back-perspective view of a proposed motor enclosure, according to an exemplary embodiment of the invention.

In FIG. 4, we see the back of the unit more clearly, including the On/Off Speed control 302 as well as a power input cap 304. We note that the external fins 206 may extend completely or partly along the length of the enclosure body 204.

Figure 5:
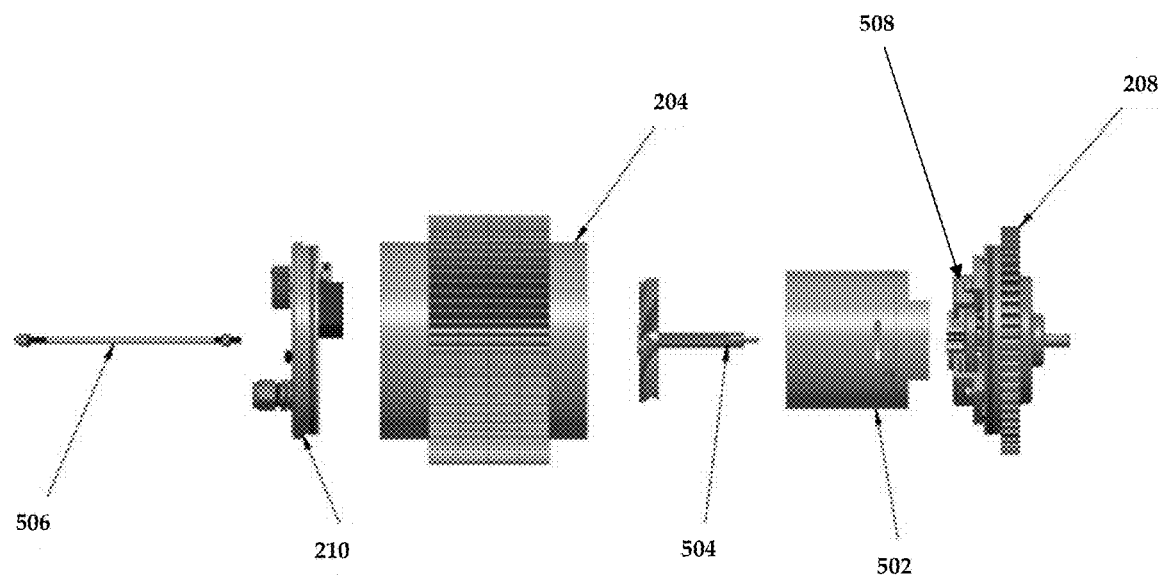
FIG. 5 is an exploded view of a proposed motor enclosure, according to an exemplary embodiment of the invention.

The inside of the enclosure 200 can be best appreciated in FIG. 5, where we see all the components 500 exploded. These include the fin elements 208 in the front cap, an internal cavity fan duct assembly 502, an axial fan assembly 504, the center housing assembly 204, the back cap 210 and a compression rod assembly 506. The fan motor assembly 508 can be seen next to the front cap 214.

Figure 6:
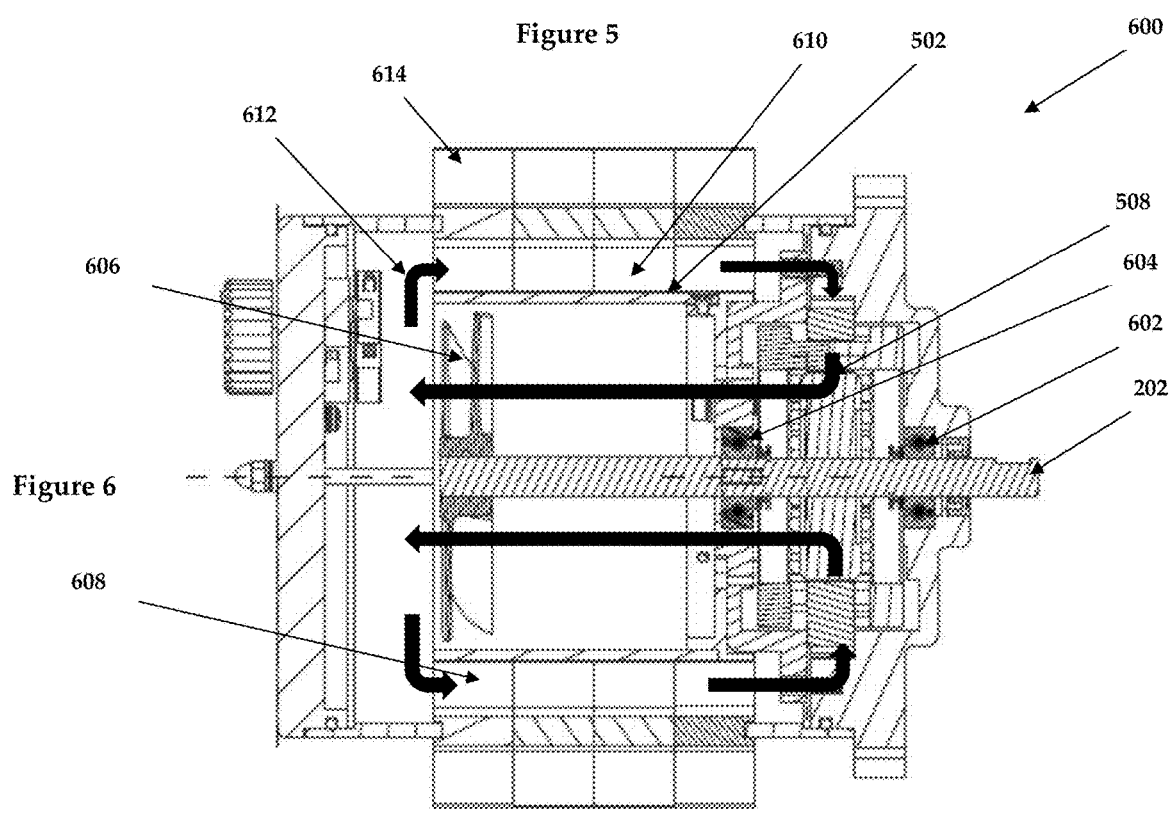
FIG. 6 is a cut away view of a proposed motor enclosure, according to an exemplary embodiment of the invention.
Figure 7:
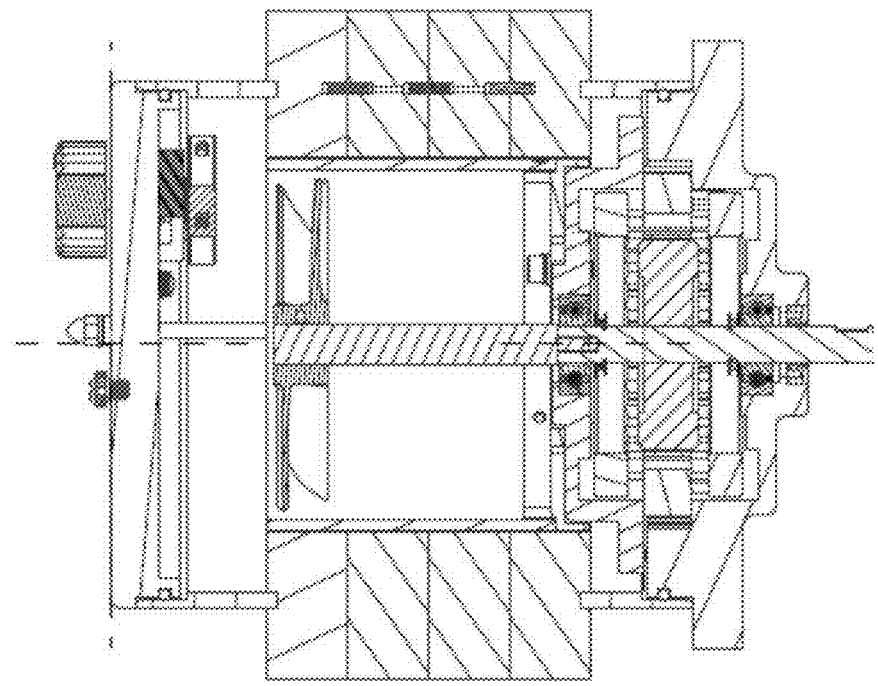
FIG. 7 is a cut away view of a proposed motor enclosure, according to an exemplary embodiment of the invention.

In one view 600 (FIG. 6), we see a cross section 600 of the internal chamber for one embodiment of the enclosure 200, in it the shaft 202 moving the fan blades 102 goes across the front enclosure rotating seals 602, designed to keep the inside of the enclosure 200 sealed (either pneumatically or against fluids). In one embodiment, the fan motor 508 is located in the front, keeping the shaft 202 sealed through a rear set of seals 604.

The motor assembly 508 is thus enclosed in a chamber that has two primary internal pneumatic openings, one for entry, the other for exit, so that the internal volume of fluid (gas, air, gas/air mixture or even an electrically insulating liquid (such as liquid silicone or similar liquid (similar to that used in liquid cooled LED bulbs)) is allowed to be sealed and recirculated within the enclosure 200.

In one embodiment, the fan duct 502 has no fan, creating a chimney that naturally circulates the fluid along the duct 502, against the outside of the enclosure and through the motor assembly 508. In FIG. 13, we see the details 1300 of one embodiment of the fan duct assembly 502 and fan duct mounting plate 1302 to interface with the motor mount 508. This simplest of the embodiments, uses the natural heat exchange/emitting capabilities of the housing 204, front cap 214 and back cap 210 to extract the heat from the inner sealed volume of the enclosure 200 to the outside.

Of course, laminar flow against the enclosure skin 204, will mean that the fluid closest to the duct 502 will remain at a higher temperature than that touching the 'skin' of the housing/front cap/back cap (204, 214, 210). In addition, in certain configurations (such as fans that are horizontal), the convective fluid flow may also be sub-optimal.

Figure 15:
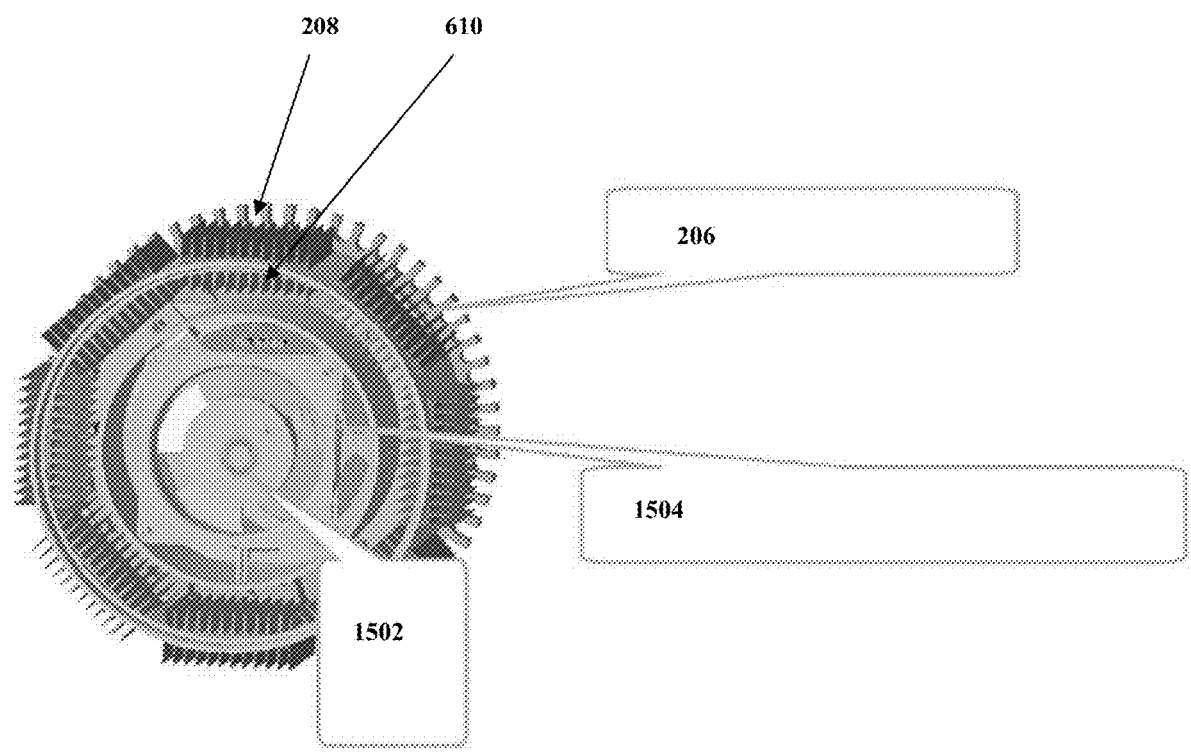
FIG. 15 is a perspective view of a motor with a separate internal cooling fan motor, according to an exemplary embodiment of the invention.

In one embodiment, this flow may be helped by the addition of one or more internal fan blade 606 connected to the central shaft 202. Designed to operate within the duct 502, this would accelerate the fluid within it, forcing it to flow against the side 608 ducts on their way back to the motor assembly 508. In this fashion, the operation of the motor, which rotates the shaft 202 for the external blades 102 also acts as energy to rotate one or more inner fan blade(s) 606. In an alternate embodiment (FIG. 15), a simple separately powered computer fan 1502 (motor and blade 1504) may replace this, allowing the enclosure 200 to continue cooling after the main fan motor has been turned off.

Of course, the above improves the ability to extract the heat from the enclosure 200, but does not solve the problem of laminar airflow. Which still allows the fluid making contact with the external enclosure walls (204/214/210) to cool more that that remaining against the outside wall of the duct 502. One solution, is the creation of turbulent flow, which could be arranged in one embodiment, by the treatment of the inner surface of the walls (204/214/210) and/or the outer surface of the duct 502 via surface features such as protuberances, rifling or such other flow components.

In one embodiment, this heat transfer from the internal fluid is helped by the addition of internal fin structures 610, so that as the fluid flows 612 in the outside skirt duct channel (formed by the volume between the inside walls of the external housing 204 and the outside wall of the duct 502) it make contact with the internal fins 610 and is transferred to the outside of the external housing 204. In many situations, this would be enough to cool the inside.

Figure 16:
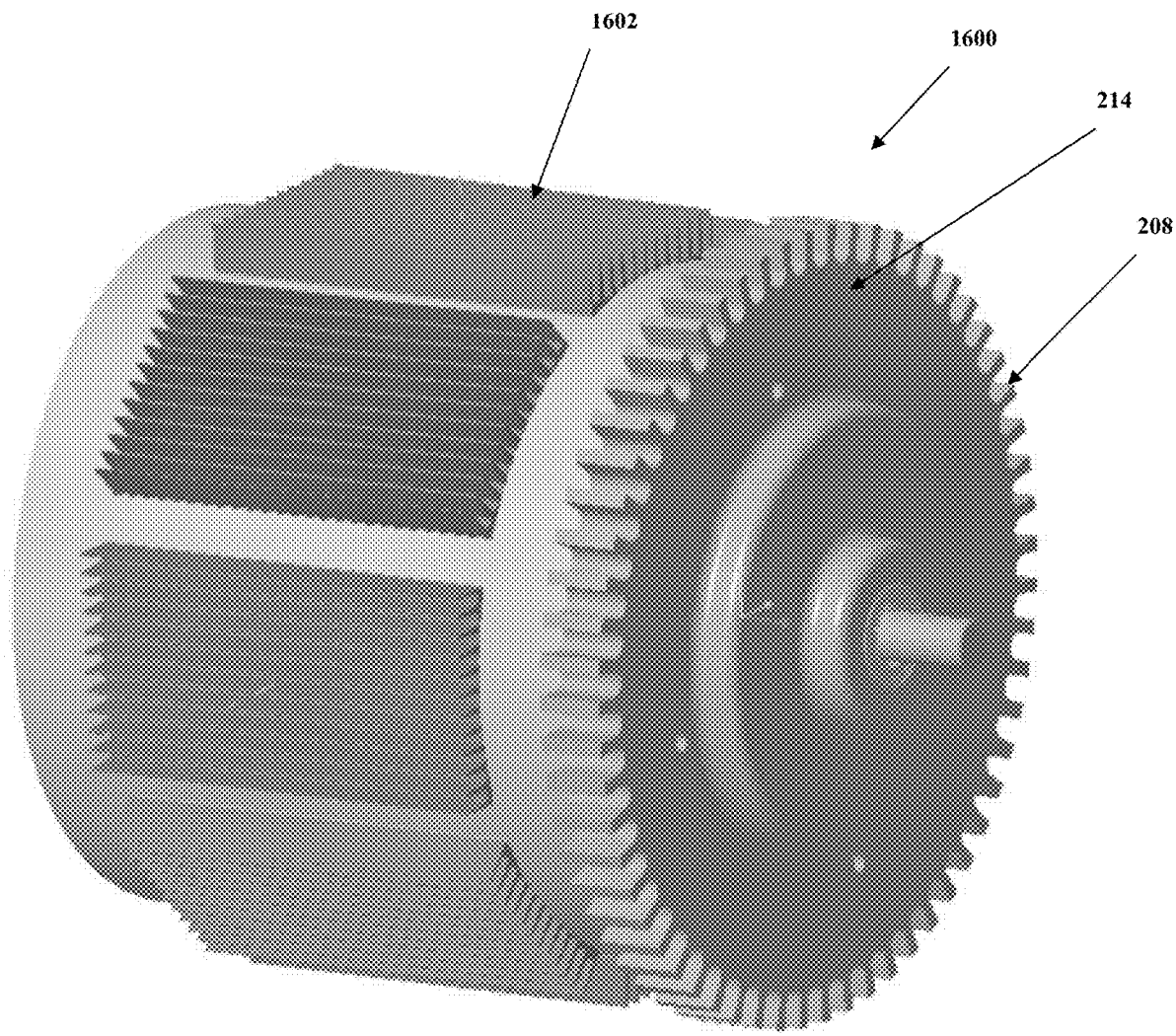
FIG. 16 is a perspective view a proposed motor enclosure, according to an exemplary embodiment of the invention.

In another embodiment, a set of external fins 206 are added so that the heat transferred to the external housing 204 results finds more surface area through which to be emitted. Thus in one embodiment, the fins may only be external 206 and mechanically (screws, bolts, rivet, cinch, skirt) attached 1600 (FIG. 16) to the housing 204, while in another they are similarly attached to both the inside and the outside of the housing.

In another embodiment, the housing 204 is comprised of a casted/machine/3D printed single piece 1200 (made of metal, plastic, carbon fiber, metal impregnated resin, wood or other material) that has both the external 206 and internal 610 fins built into the assembly.

Figure 11:
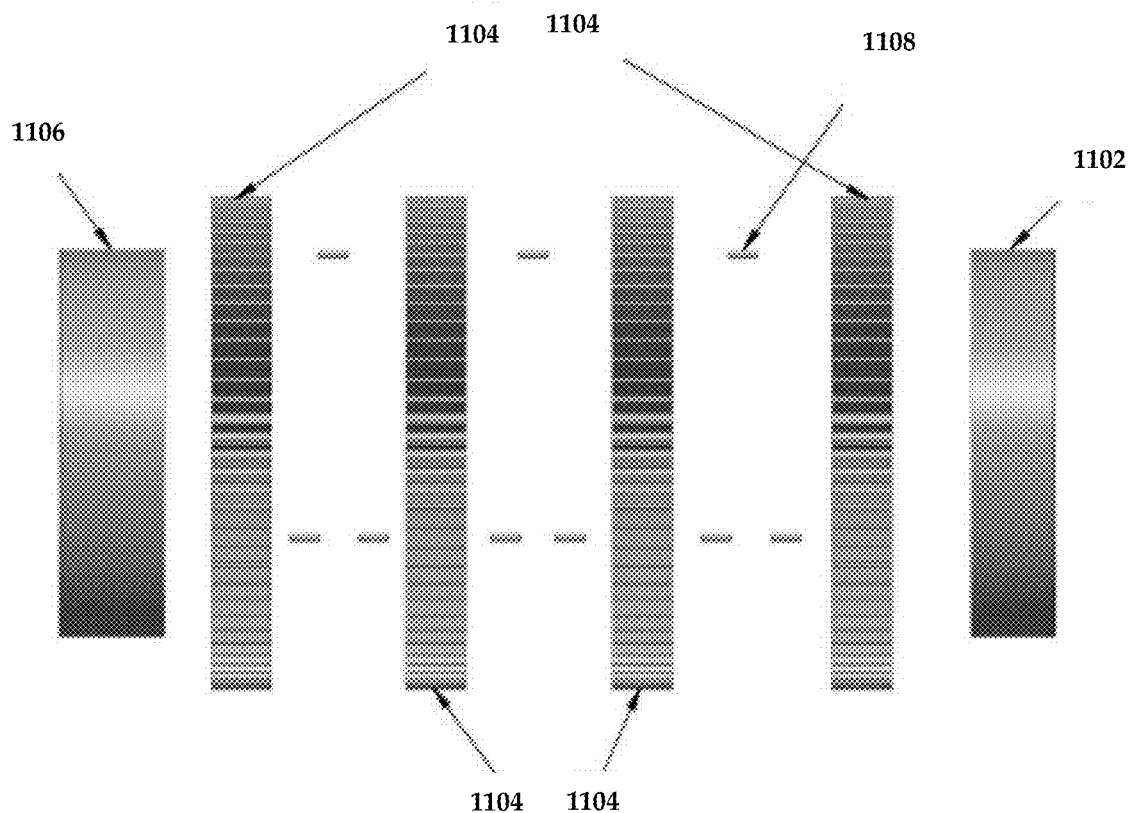
FIG. 11 is a side view of a proposed motor housing, according to an exemplary embodiment of the invention.
Figure 12:
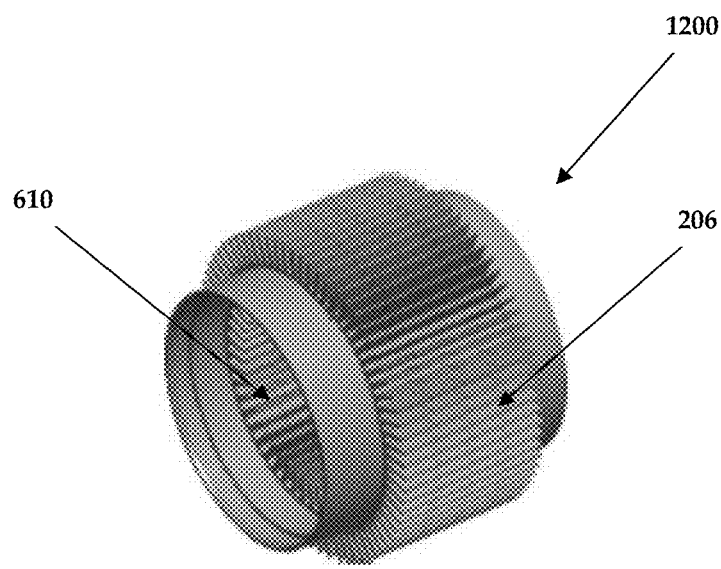
FIG. 12 is a perspective view of a proposed motor housing, according to an exemplary embodiment of the invention.

In yet another embodiment (FIG. 11), the housing 204 is created by concatenating a series of volumes 1102, 1104, 1106 (which may be rings, ellipses, squares, rectangles or any other suitable shape) that are either smooth 1102/1106, or have inner and/or outer fins 1104. The concatenation 1100 using dowels 1108 creates a sealed enclosure 1200 that need only be capped by the front 214 and back caps 210 to create the sealed housing 200 for the fan. The advantage of the fin housing component 1104 is that the heat transfer occurs completely within the component, allowing for the most efficient transfer of the internal housing 200 heat to the exterior of the fan.

Figure 8:
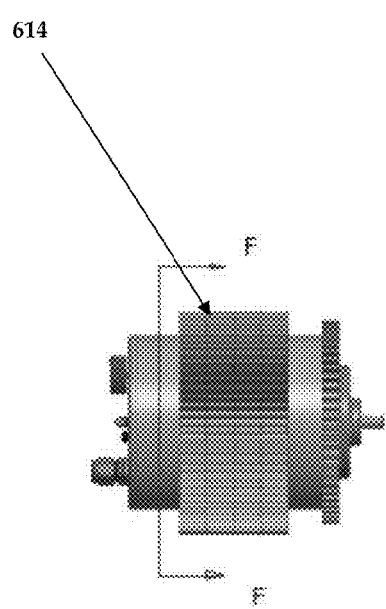
FIG. 8 is a side view of a proposed motor enclosure, according to an exemplary embodiment of the invention.
Figure 9:
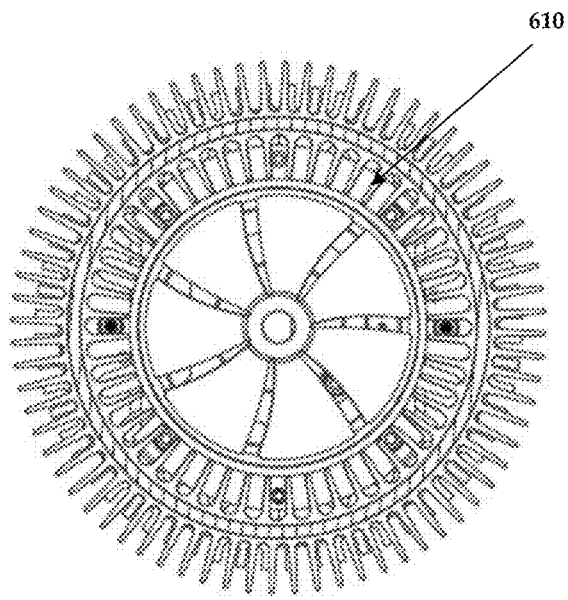
FIG. 9 is a cut away view of the inside of a proposed motor enclosure, according to an exemplary embodiment of the invention.

In yet another embodiment 800/900 (FIGS. 8-9), we can see an embodiment (cross section F) where the internal fins 610 extend along the majority of the length inside of the enclosure, but not completely outside 614.

Figure 10:
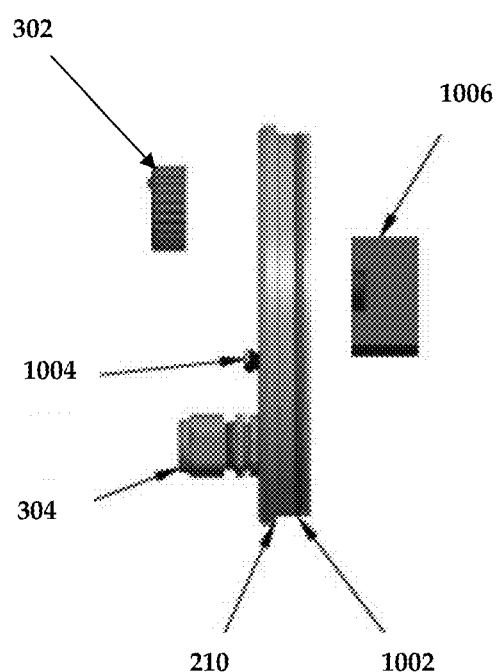
FIG. 10 is a side view of a proposed back cap, according to an exemplary embodiment of the invention.

In FIG. 10 we appreciate details of one embodiment of the back plate 210, where we can notice the O-rings 1002 to seal the back plate 210 against the length enclosure 204, with a number of sealable openings such as a sealing vent 1004, power input vent 304 and adjustment knob 302 connected to a capacitor inside 1006.

In a similar arrangement, in one embodiment the front cap 214 may house the fan motor, which is comprised of an O-ring 1402 (to seal the cap 214 against the length enclosure 204, front cap fin elements 208, motor assembly (stator) 1406 and squirrel cage (rotor) 1404, housing assembly 1408 and screws 1410. Any appropriate electric motor may be used.

CONCLUSION

In concluding the detailed description, it should be noted that it would be obvious to those skilled in the art that many variations and modifications can be made to the shown embodiments without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any "exemplary embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

The invention claimed is:

1. A sealed electric motor enclosure comprising:
a front cover, a back cover and a central housing section connected so as to form a sealed electric motor enclosure;
an electric motor mounted within said sealed enclosure, mechanically linked to said front cover, said motor having a central shaft that protrudes across said front cover;
a continuous duct within said central housing closely surrounding said electric motor that ends shortly before both said front cover and said back cover, so that a fluid flow path is formed going through the inside of said duct through said motor and retuning along the skirt duct channel formed between the exterior of said duct and the inside of said central housing;
a fan blade placed within said duct and connected to said central shaft;
one or more internal fins placed inside said skirt duct and lined along the fluid flow path direction of travel, said fins being connected to the inside of said central housing;
wherein said electric motor enclosure's internal volume is filled with an electrically inert fluid; and
a valve and power connections across said enclosure walls.

2. The enclosure of claim 1 wherein:
said central housing external's surface is equipped with one or more fins.

3. The enclosure of claim 2 wherein:
said front cap or said back cap external surfaces are equipped with fins.

4. The enclosure of claim 3 wherein:
said sealed electric motor enclosure is filled with an electrically insulating fluid including one or more of:
air, gas, silicone fluids;
said external fins are comprised of one or more of:
fins that are chemically secured and/or mechanically secured to said sealed enclosure body and/or fins that are an integral part of said sealed enclosure body; and
said internal fins are comprised of one or more of:
fins that are chemically secured and/or mechanically secured to said sealed enclosure body and/or fins that are an integral part of said sealed enclosure body.

5. The enclosure of claim 4 wherein:
an external fan blade is attached to said motor's central shaft outside said electric motor enclosure.

6. The enclosure of claim 2:
said sealed enclosure is filled with an electrically insulating fluid including one or more of:
air, gas, silicone fluids;
said internal fins are comprised of one or more of:
fins that are chemically secured and/or mechanically secured to said sealed enclosure body and/or fins that are an integral part of said sealed enclosure body; and
an external fan blade is attached to said motor's central shaft outside said electric motor enclosure.

7. The enclosure of claim 1 wherein:
a separate electric motor and fan blade placed inside said electric motor enclosure are coupled to said duct so as to provide internal fluid motion independent of said central shaft's motion.

8. The enclosure of claim 7 wherein:
said front cap or said back cap external surfaces are equipped with fins.

9. The enclosure of claim 8 wherein:
said sealed electric motor enclosure is filled with an electrically insulating fluid including one or more of:
air, gas, silicone fluids;
said external fins are comprised of one or more of:
fins that are chemically secured and/or mechanically secured to said sealed enclosure body and/or fins that are an integral part of said sealed enclosure body; and
said internal fins are comprised of one or more of:
fins that are chemically secured and/or mechanically secured to said sealed enclosure body and/or fins that are an integral part of said sealed enclosure body.

10. The enclosure of claim 9 wherein:
an external fan blade is attached to said motor's central shaft outside said electric motor enclosure.

11. A method of operating a motor, said method comprising:
providing a sealed electric motor enclosure comprised of a front cover, a back cover and a central housing section connected so as to form a sealed electric motor enclosure;
said enclosure housing an electric motor mounted within said sealed enclosure, mechanically linked to said front cover, said motor having a central shaft that protrudes across said front cover;
said enclosure housing a continuous duct within said central housing closely surrounding said electric motor that ends shortly before both said front cover and said back cover, so that a fluid flow path is formed going through the inside of said duct through said motor and retuning along the skirt duct channel formed between the exterior of said duct and the inside of said central housing said enclosure housing a fan blade placed within said duct and connected to said central shaft, with one or more internal fins placed inside said skirt duct and lined along the fluid flow path direction of travel, said fins being connected to the inside of said central housing;

wherein said electric motor enclosure's internal volume is filled with an electrically inert fluid; and a valve as well as power connections across said enclosure walls, so that said power connections are connected to a power source.

12. The method of claim 11 wherein:

said central housing external's surface is equipped with one or more fins.

13. The method of claim 11 wherein:

said sealed electric motor enclosure is filled with an electrically insulating fluid including one or more of:

air, gas, silicone fluids;

said external fins are comprised of one or more of:

fins that are chemically secured and/or mechanically secured to said sealed enclosure body and/or fins that are an integral part of said sealed enclosure body; and said internal fins are comprised of one or more of:

fins that are chemically secured and/or mechanically secured to said sealed enclosure body and/or fins that are an integral part of said sealed enclosure body.

14. The method of 13 wherein:

an external fan blade is attached to said motor's central shaft outside said electric motor enclosure.

15. The method of 11 wherein:

a separate electric motor and fan blade placed inside said electric motor enclosure are coupled to said duct so as to provide internal fluid motion independent of said central shaft's motion.

16. The method of claim 15 wherein:

said front cap or said back cap external surfaces are equipped with fins;

said sealed electric motor enclosure is filled with an electrically insulating fluid including one or more of:

air, gas, silicone fluids;

said external fins are comprised of one or more of:

fins that are chemically secured and/or mechanically secured to said sealed enclosure body and/or fins that are an integral part of said sealed enclosure body; and said internal fins are comprised of one or more of:

fins that are chemically secured and/or mechanically secured to said sealed enclosure body and/or fins that are an integral part of said sealed enclosure body; and an external fan blade is attached to said motor's central shaft outside said electric motor enclosure.

* * * * *